UNITED STATES PATENT OFFICE 2,461,538

FIRE-RETARDING COMPOSITIONS

Earl K. Fischer, Long Island City, N. Y., assignor to Interchemical Corporation, New York, N. Y., a corporation of Ohio No Drawing. Application May 25, 1944, Serial No. 537,356

3 Claims. (Cl. 260—28)

This invention relates to flame-retarding compositions intended for application to cellulosic materials, particularly cellulosic textiles, and to other inflammable objects, and aims to provide a novel composition characterized by good resistance to both flame propagation and after glow.

A great many compositions have been considered and recommended for reducing the inflammability of textiles, and similar organic materials. Some materials (such as water glass, and other inert mineral materials) act to reduce the inflammability by sheer dilution of the organic material with non-inflammable inorganic material. Other products act to reduce the flame. One group of these products acts by producing a smothering gas (e. g. decomposable carbonates). Possibly the most effective group is the charring agents, like sulfamic acid, phosphoric acid, and the decomposable organic halides such as chlorinated naphthalene, chlorinated diphenyl, chlorinated paraffins, and the like, preferably catalyzed to decompose more rapidly by heat into the effective charring agent, HCl, by agents such as tin oxide and antimony oxide. A third group of materials is the so-called glow retardants, which do not primarily inhibit the flame, but cause it to quench quickly; fusible borates are typical of this class of material. Satisfactory flame-retardant compositions generally include both a flame reducer and a glow retardant, very often in combination with a diluting non-inflammable material.

The available glow-retardants have been seriously handicapped by the fact that they are largely water-soluble, and by the fact that they are somewhat difficult to disperse with the more commonly used flame reducers, such as the organic halides. The available glow-retardants when used with organic halides have not been satisfactory for several reasons. They are leached out of the composition during weathering, and their effectiveness is accordingly lost. Some promote excessive decomposition of the binder leading to poor ageing qualities as shown by decreased protection against flame propagation as well as boardiness in the fabric. Further, some are difficult to disperse in the binders.

I have discovered a new glow retardant useful generally in flame-retarding compositions, particularly in combination with flame-reducers of the charring type, which is water-insoluble and easy to disperse. My new glow retardants are insolubilized aminoplast powders, preferably of pigment particle size (in the range of 0.2-5 microns diameter average particle size) so that they may readily be dispersed in the composition.

These insoluble aminoplasts are prepared in conventional fashion by reacting formaldehyde with urea, thiourea, derivatives of urea such as biuret, guanidine, dicyandiamide, etc., and materials like cyanuramide (melamine) which react with formaldehyde in a manner analogous to urea. Other aldehydes may be used in place of formaldehyde. The reaction product is normally insoluble in water and after filtration is dried at temperatures which convert the powder to a material which is substantially insoluble also in solvents. The initial reaction product may exhibit, however, some solubility in water and can alternately be subjected to spray drying and, if desired, subsequent heat-treatment, to get the desired insolubility.

For the purposes described the aminoplast should be insoluble in water and in the solvents conventionally used in coating compositions (e. g. alcohols, esters, hydrocarbons and mixtures thereof). The term "insolubilized" is to be interpreted as indicating conversion by chemical reaction, subsequent heat-treatment or both, such that the product will remain as discrete particles in the presence of solvents. The powders may, however, be capable of swelling to a limited extent in certain of these solvents; indeed, this is an advantage for some applications since the solvent-swollen particles on further processing fuse together and bond to the fabric in a manner which provides greater film integrity, wear-resistance, and superior weathering properties.

When a small amount of the insolubilized aminoplast is incorporated in compositions containing binders, pigments, etc., decrease in afterglow is apparent, but substantial percentages (5-50% of the solid components) are preferable in order to get maximum effect.

An alternate way of adding the aminoplast glow-retardant is to precipitate it on the pigments and other solids usually incorporated, thus preparing a composite of aminoplast and pigment, in which the pigment is held in a matrix of the resinous material. This procedure is of particular advantage in compositions containing chlorinated compounds as binders and active decomposition catalysts such as iron oxide pigments. The protective action of the envelope of aminoplast on the iron oxide, for example, greatly reduces the catalytic activity of the pigment, and the composition then has greatly improved stability. This procedure has another advantage, for if several pigments are used to obtain a required hue or shade, differential separation of the pigments during application is almost inevitable, resulting in undesirable effects described in the trade as flooding, floating, silking, mottling, streaking, etc.; the matrix, however, prevents this differential separation by bonding all the pigments into one unit.

Typical of the preparation of the aminoplast powders are the following examples:

Example 1

A quantity of 669 parts by weight of a 30% aqueous formaldehyde solution substantially free of methanol, and 0.49 part of phosphoric acid ($H_3PO_4$) are heated to 60° C.; 144 parts of urea are slowly added in quantities of 18 parts every five minutes. Due to exothermic reaction, the mixture is cooled to prevent the temperature from exceeding 68° C. After all of the urea has been added, the mixture is heated to 93° C., and held at this temperature for fifteen minutes. The properties of the mixture at this time are as follows:

Color: Water white and clear
Specific gravity: At 21° C.—1.1409
pH: 2.5
Solids: 34%

This resin solution is then spray dried in a centrifugal type of spray dryer, and 95% of the calculated solids collected in the form of a fine powder. During the spray drying operation, the resin solution is maintained at a temperature of approximately 70° C. in order to avoid the possibility of the resin gelling. Heated air is used in the spray dryer at an inlet temperature between 120° C. and 160° C., with the average air temperature in the spray drying chamber not over 94° C. The powder is white, and of flour-like consistency. Although the spray dried powder is not completely unswellable in all organic solvents, it is sufficiently insoluble to make a satisfactory glow-retarding agent. A more insoluble powder may be obtained by spray drying the urea resin at higher temperatures.

Even though the spray dried powder is very fine, it is usually desirable to break the particles up into smaller pieces. This may be done by ball mill grinding, but the preferred method is to subject the powder to a "micromizing" process.

The glow-retarding agent can be prepared without the steps of spray drying and grinding by carefully controlling the conditions of the condensation reaction. Ordinarily, when a carbamide and an aldehyde are co-reacted, the condensation product will become a gel (if the condensation is carried far enough), rather than precipitate as a powder. The reaction can be made to produce a solid condensation product of a seemingly semi-crystalline texture which is very easily powdered, by controlling the concentrations of the reactants, the temperature of reaction, and the degree of agitation during precipitation.

The following example shows a typical process of making the glow-retarding agent directly:

Example 2

One thousand parts by weight of 37% aqueous formaldehyde are made alkaline to litmus by the addition of barium hydroxide (any other suitable base may be used). To this neutralized formaldehyde 370 parts of urea are added gradually with stirring. The stirring of the mixture is continued for one hour. Then 1000 parts of water and 60 parts of ethyl alcohol (denatured with methanol and ethyl acetate) are added, and the mixture is made acid to litmus by the addition of dilute sulfuric acid. The temperature rises rapidly after addition of the acid. After 18 hours, the mass solidifies in an apparently semi-crystalline form. It is washed thoroughly with water on a Buchner funnel and flushed with methanol to facilitate drying. When no more liquid can be drawn from the mass through the funnel, the mass is placed in an oven maintained at 200° F. for 1½ to 2½ hours. At the end of the heating period, the resin is very easily powdered by rubbing in the hands and can be passed through a 200 mesh screen. The yield of powdered urea resin glow retarding agent is 360 parts by weight.

A number of variations can be made in the above procedure. For example, dilution of the reaction mixture with double the amount of water (prior to acidifying) results in increasing the yield to 410 parts of urea resin powder.

Other variations involve the use of higher reaction temperatures and especially the use of wetting agents in controlling the physical condition of the precipitated aminoplast reaction product. Examples of these variations are as follows:

Example 3

By reacting the carbamide and aldehyde in the presence of a weak acid, with excess carbamide over that necessary to form the dialkylol derivative, and in the presence of a wetting agent, exceptionally fine particles of insoluble condensation product are obtained. These particles do not easily settle out of suspension in the vehicle of the finish, and when they do they are easily redispersed by simple stirring.

18 parts by weight of urea are dissolved in 25 parts of water, and 0.02 part of Duponol ME (sodium lauryl sulfate) is added. Then 25 parts of 38% aqueous formaldehyde are added to the urea, and the mixture is heated to 135° F. On reaching this temperature, 0.75 part of glacial acetic acid is added with stirring. The condensation takes place immediately with the formation of a colorless precipitate. The temperature rises within about 5 minutes to 200° F. to 205° F. In the event that the temperature should go too high with foaming, it may be controlled by adding cold water. When the temperature begins to fall, the mixture is heated to maintain it at 200° F. to 205° F. for two hours, and at the end of this time the mixture is filtered in a standard filter press. During transfer of the mixture or slurry to the filter press, the stirring must not be stopped or settling of the precipitate will occur with consequent "freezing" of the stirrer. The precipitate in the filter press is washed with water until the filtrate is neutral to litmus, and then it is blown with compressed air until no more water can be removed. On removal from the press, the precipitate is dried at about 300° F. in a well ventilated drier. The yield is 20 parts by weight. The dried material is in the form of a fine pulverulent powder.

The powder may also be coprecipitated with pigments—thus:

Example 4

|  | Grams |
|---|---|
| Dimethylol urea, 70% | 256 |
| Water | 300 |
| Urea | 90 |
| Sodium lauryl sulfate | 1 |

To this mixture is added, with stirring—

|  | Grams |
|---|---|
| Phthalocyanine blue, 20% pulp | 245 |

When thoroughly dispersed, there is added—

|  | Cubic centimeters |
|---|---|
| Glacial acetic acid | 15 |

This mixture is then diluted with an equal volume of water, and boiled to precipitate the pigment-resin composition.

Example 5

|  | Grams |
|---|---|
| Urea | 600 |
| Carbon black aqueous dispersion 20% solids | 360 | are dispersed in—

|  | Cubic centimeters |
|---|---|
| Water | 3000 | then heated, with stirring, to 85° C., and

|  | Grams |
|---|---|
| Formalin (38% formaldehyde) | 850 | are added. After stirring for twenty minutes

|  | Cubic centimeters |
|---|---|
| Glacial acetic acid | 10 | are added. The mixture is acid to litmus, and it is held at 96-97° F. for three hours, and filtered, and the filter cake is washed with hot water, and dried at 300° F. overnight. Yield—757 grams of a soft, lumpy powder.

Example 6

| | |
|---|---|
| Urea kg | 8.200 |
| Formalin (40%) kg | 11.520 |
| Carbon black aqueous dispersion, 20% pigment kg | 4.100 |
| Sodium salt of a fatty alcohol sulfate (Duponol ME) kg | 0.025 |
| Hydrochloric acid cc | 350.000 |
| Water liters | 100.000 |

The procedure follows:

The carbon black dispersion and water are stirred to a uniform suspension; the urea is then added, followed by the Duponol ME (a surface-active agent). The mixture is stirred 10 minutes; Formalin solution is then added, and the mixture is stirred 10 minutes. The temperature is brought to 60° C. and hydrochloric acid then added. The pH at this stage is 3. The temperature is raised to boiling, and held at boiling temperature with stirring for one-half hour; the mixture is filtered in a laboratory filter press, and the filter cake is washed in the press until wash water is neutral to litmus. Dried at 90° C. Yield: 8.68 kg.

As examples of flame-retarding compositions utilizing my invention, the following are typical:

Example 7

A piece of cotton duck was treated with a flame retarding composition consisting of 2 parts by weight chlorinated paraffin (40% chlorine Hooker Plasticizer E-40), and 1 part by weight antimony oxide, in a neutral solvent. An essentially similar product was then made, using 2 parts chlorinated paraffin, 1 part antimony oxide, and 1 part of the insoluble powder of Example 2.

The following characteristics were observed:

|  | Without Powder 40% Loading | With Powder 40% Loading | With Powder 50% Loading |
|---|---|---|---|
| Burn Time (Seconds) | 0 | 0 | 0 |
| Glow Time (Seconds) | 170 | 31 | 27 |
| Char Length (Inches) | 1.8 | 0.13 | 0.25 |

Thus, while the chlorinated hydrocarbon with the decomposition catalyst effectively prevents burning, the afterglow is sharply reduced with the aminoplast powder.

Example 8

An example of an olive drab formulation for canvas duck follows:

|  | Per cent |
|---|---|
| Arochlor 5460 (chlorinated diphenyl, 60% chlorine) | 30 |
| Plasticizer E-40 (chlorinated paraffin, 40% chlorine) | 23 |
| Oleic acid | 2 |
| Antimony oxide | 15 |
| Urea resin powder | 15 |
| Iron oxide, lemon yellow | 6 |
| Iron oxide black | 4 |
| Calcium carbonate | 5 |
|  | 100 |

100 parts of these ingredients are mixed with 10 parts xylene to provide a paste suitable for three-roll mill grinding. Four passes on the mill provide adequate dispersion, and the resulting paste is diluted further with 70 parts of xylene in which form it is suitable for knife coating onto a web of canvas duck.

In place of the chlorinated paraffin, and the mixture thereof with chlorinated diphenyl, the chlorinated naphthalenes, sold on the market as "Halowax," may be employed, as well as straight chlorinated diphenyl. The use of these chlorinated compounds is well known in the art, and is described in various patents and publications—see Leatherman U. S. Patent No. 2,326,233, Clayton et al., U. S. Patent No. 2,299,612, Leatherman U. S. Patent No. 2,286,744, etc.

Obviously, examples can be multiplied, and various formulations changed. My invention lies in the discovery that insolubilized aminoplast resin powders make excellent glow-retardants when used in combination with fire retardant agents which act by charring, as more fully set out in the claims.

I claim:

1. In a fire-retarding composition, the combination of a flameproofing agent selected from the group consisting of chlorinated paraffin, chlorinated naphthalene, and chlorinated diphenyl and from 5 to 50%, based on the total weight of solids in the composition, of a powdered water- and organic solvent-insoluble non-combustible glow-retarding reaction product of an aldehyde with a member of the group consisting of urea, thiourea, biuret, guanidine, dicyandiamide and melamine, the average diameter of the reaction product particles ranging from 0.2 to 5 microns.

2. A fire-retarding composition comprising an organic solvent having dissolved therein a flameproofing agent selected from the group consisting of chlorinated paraffin, chlorinated naphthalene, and chlorinated diphenyl and having dispersed therein from 5 to 50%, based on the total weight of solids in the composition, of a powdered water- and organic solvent-insoluble non-combustible glow-retarding reaction product of an aldehyde with a member of the group consisting of urea, thiourea, biuret, guanidine, dicyandiamide and melamine, the average diameter of the reaction product particles ranging from 0.2 to 5 microns.

3. A weather-resistant fireproofed cellulosic material impregnated with a flame-proofing agent selected from the group consisting of chlorinated paraffin, chlorinated naphthalene, and chlorinated diphenyl, said flameproofing agent being present in sufficient quantity to prevent flame-propagation, and from 5 to 50%, based on the total weight of fireproofing solids, of a water- and organic solvent-insoluble non-combustible glow-retarding reaction product of an aldehyde with a member of the group consisting of urea, thiourea, biuret, guanidine, dicyandiamide and melamine, the average diameter of said particles ranging from 0.2 to 5 microns, said particles being dispersed in the flameproofing agent.

EARL K. FISCHER.

REFERENCES CITED

The following references are of record in the file of this patent:

UNITED STATES PATENTS

| Number | Name | Date |
|---|---|---|
| 1,885,870 | Snyder | Nov. 1, 1932 |
| 2,106,938 | Tramm et al. | Feb. 1, 1938 |
| 2,174,012 | Saunders | Sept. 26, 1939 |
| 2,190,776 | Ellingboe | Feb. 20, 1940 |
| 2,254,072 | Jenkins | Aug. 26, 1941 |
| 2,335,958 | Parker | Dec. 7, 1943 |
| 2,378,715 | Leatherman | June 19, 1945 |
| 2,379,236 | Jenkins | June 26, 1945 |
| 2,413,163 | Bacon | Dec. 24, 1946 |

FOREIGN PATENTS

| Number | Country | Date |
|---|---|---|
| 476,043 | Great Britain | Nov. 29, 1937 |

OTHER REFERENCES

Forest Products Laboratory, U. S. Dept. of Agric., Madison, Wisc. Publication No. R1280, Sept. 1942, page 8.

Lucifer: Silk Journal and Rayon World, Nov. 1942, pages 19, 20 and 22.

Redmond: American Dyestuff Reporter, vol. 32, Aug. 30, 1943, pp. 375 to 378.